(12) United States Patent  (10) Patent No.: US 8,407,975 B2
Bell  (45) Date of Patent: Apr. 2, 2013

(54) COTTON AIR HARVESTER (76) Inventor: James A. Bell, Ocilla, GA (US)

( * ) Notice: Subject to any disclaimer, the term of this patent is extended or adjusted under 35 U.S.C. 154(b) by 11 days.

(21) Appl. No.: 12/786,375

(22) Filed: May 24, 2010

(65) Prior Publication Data

US 2011/0131939 A1   Jun. 9, 2011

Related U.S. Application Data (60) Provisional application No. 61/216,882, filed on May 22, 2009.

(51) Int. Cl.
A01D 46/08 (2006.01)
(52) U.S. Cl. .............................. 56/30; 56/12.9
(58) Field of Classification Search .......... 56/12.8–13.2, 56/28, 30–32, DIG. 8
See application file for complete search history.

(56) References Cited

U.S. PATENT DOCUMENTS

| 2,140,399 A * | 12/1938 | Connolly ........................ 56/28 |
| 2,763,978 A * | 9/1956 | Graham et al. .................. 56/30 |
| 3,174,265 A | 3/1965 | Capps |
| 3,486,315 A * | 12/1969 | Boynton .......................... 56/30 |
| 3,546,859 A | 12/1970 | Owen, Jr. |
| 3,964,242 A * | 6/1976 | Stone ............................. 56/30 |
| 4,027,464 A * | 6/1977 | Stone ............................. 56/30 |
| 7,743,593 B2 * | 6/2010 | Owen ............................. 56/31 |
| 7,797,916 B2 * | 9/2010 | Thompson ...................... 56/30 |
| 2004/0103630 A1 | 6/2004 | Kitchen |

* cited by examiner

Primary Examiner — Alicia Torres (57) ABSTRACT

A cotton air harvester header assembly for attachment to the front lifting mechanism of a conventional self propelled cotton harvester's chassis, for movement through a field of cotton plants in equally spaced rows. Air harvesters use air flow (wind, vacuum, atmospheric pressure) to harvest cotton. The enormous amount of plant material moving thru harvester's row units, create a self cleaning environment using cotton plants as a cleaning method to continually push unwanted material past harvester's self cleaning extractor units. Air harvesters do not require spindles, doffers, brushes, rotating drums or cutter blades, and the elimination of thousands of parts, allows harvester's row units to be grouped closer together than spindle or stripper harvesters, resulting in a more versatile cotton harvester which can be configured to harvest wide row or narrow row cotton, and be mounted on a tractor or used as a single walk behind air harvester row unit.

9 Claims, 7 Drawing Sheets

Wide Row Cotton Air Harvester Header Assembly
FIG. 1

FIG.6

Top View
FIG.7

COTTON AIR HARVESTER

PRIORITY CLAIM

This application claims benefit of U.S. provisional application Ser. No. 61/216,882 filed on May 22, 2009.

FIELD OF THE INVENTION

The present invention relates generally to cotton harvesters, and more particularly to cotton harvesters which are designed to harvest seed cotton from cotton plants using air flow, (wind, atmospheric pressure, vacuum). Cotton air harvesters use air flow as a complete harvesting method, and do not require spindles, doffers, brushes, rotating drums or cutter blades to harvest cotton.

BACKGROUND OF THE INVENTION

Cotton harvesting can be divided into four groups; hand method, air method, (pneumatic, vacuum), stripper method, and spindle method.

Hand method: Cotton was first harvested by hand and had to be pulled from every boll, which required bending and stooping for long periods of time. As the cotton was picked it was put into long cloth bags which pickers would drag behind them until they became too heavy and had to be emptied. Hand picking was slow and labor intensive, requiring massive amounts of people to harvest the ever increasing amount of cotton planted yearly.

Air Method: Cotton is vacuumed from cotton plants and is blown into harvester's basket. Air harvesting of cotton has been tried for many years, yet without any commercial success. International Harvester (IH) of Chicago, Ill., experimented with pneumatic pickers, but after three years of work, Harvester realized that a skilled hand picker could easily pick faster than their pneumatic machine.

Stripper method: Stripper harvesters are used to harvest cotton; the stripper harvester works by stripping cotton off the cotton stalks where large amounts of unwanted material are also stripped from cotton stalks and must be removed (separated) from the seed cotton. Higher ginning cost has a negative impact on stripper harvesting.

Spindle method: Spindle pickers use rotating barbed spindles to snare seed cotton and pull it from the cotton plant. Doffers then remove cotton from spindles which is then blown into harvester's basket. Spindle cotton harvesting was made possible with the Rust Brothers' spindle harvester. Now more cotton could be harvested using less people to harvest it. Although, more cotton could be harvested in less time, other problems had to be overcome, spindle picked cotton had a higher trash content than hand picked cotton. Also spindles would grind trash into cotton fibers, making it more difficult to gin. Spindle harvesters require a certain amount of spindles to adequately pick cotton. With increased harvesting speed, more spindles are required to keep pace with the speed of harvesters. A closer look at spindle cotton harvesters reveals that spindle harvesters are one of the most complicated pieces of farm equipment on the farm, and are reaching their maximum in these areas: Size, weight, speed, row width, cost, water (365 gal. approximately 2,920 lbs.), Lubrication (80 gal. approximately 600 lbs.). Other problems with spindle harvesters are; Spindles, doffers, moistener pads, chains, bars, and cutter blades wear out, wetting seed cotton, seed damage, spindle twist, spindle warping, spindle breakage, trash content (rotating spindles grind bark from stalk). Safety is also a problem with spindle harvesters. Recognizing the problems with spindle and stripper harvesters is the first step in solving these problems.

Although no successful commercial harvesters has been produced, those early inventors knew that air harvesting was worthy of refinement and researching. Since then many advancements have been made which were not available to them. As we look back over the many patents, as far back as the 1800's, we can get an overall picture of how air was used in cotton harvesters. We also must understand that those inventions did not reflect the modern harvesting methods of today. At that time, hand picking was the standard, and no one could have envisioned the huge cotton harvesters of today.

Modern cotton farming has changed the way cotton is planted, cultivated, and harvested. Cotton plants are grown closer together producing a more uniform cotton plant which makes it more preferable for modern mechanical harvesting. Uniform growing of cotton plants make it easier to compress cotton limbs together as cotton plants pass thru harvester units.

Cotton is well suited for air harvesting in that it reacts well to air flow, and is easily dislodged, (vacuumed) from cotton burr, it takes less air flow, (wind, force, vacuum) to pull seed cotton from cotton burr than to pull burr from cotton stalk. Harvester's ground speed cannot over take the air speed used to harvest seed cotton. From start to finish, cotton air harvesters use air flow as a complete harvesting method, air is a reusable resource; air never wears out. Air harvesting offers the greatest possibilities and overall improvements in cotton harvesting. No other harvesting methods are equal to these possibilities and improvements.

BRIEF SUMMARY OF THE INVENTION

General object of the present invention is to provide a cotton air harvester's row unit that is capable of harvesting seed cotton from either wide row or narrow row planted cotton using air flow, (wind, vacuum, atmospheric pressure) as a harvesting method. The embodiments herein and the various features and advantageous details thereof are explained more fully with reference to the non-limiting embodiments that are illustrated in the accompanying drawings and detailed in the following description. The examples used herein are intended to facilitate an understanding of ways in which the invention herein may be practiced and to further enable those of skill in the art to practice the embodiments herein. It is another object to overcome the aforementioned problems with current cotton harvesters. Accordingly, the examples should not be construed as limiting the scope of the claimed invention.

A cotton air harvester header assembly consisting of a main metal framework, for attachment to the front lifting mechanism of a conventional self propelled cotton harvester's chassis for movement through a field of cotton plants in equally spaced rows, comprising: air plenum transfer chamber, air harvester's row units, and self cleaning extractor units.

Air plenum transfer chamber which is mounted on top of harvester's header assembly's main metal framework, having a top, sides, ends, and bottom as to form an airtight air plenum chamber, blower fans are used to create air flow and can be mounted on top of air plenum transfer chamber, or mounted on harvester' chassis, with the air plenum transfer chamber thus making up the upper section of the cotton air harvester's header assembly.

Air harvester's row units, each comprising a left and right harvester's side panel, are attached to an underside area of the air plenum transfer chamber's main metal framework, making up the lower section of the cotton air harvester's header assembly. Harvester's row units are spaced approximately 9 inches apart with left and right side panels facing each other creating a tunnel as to allow cotton plants to move thru air harvester's row units. Harvester's row unit's smooth streamline design allows harvester's row units to slide through cotton plants with the least resistance as possible. Front cover panels are used to cover the open space between harvester's row units, and are designed to help loose falling cotton to slide over onto air harvester's self cleaning extractor units without falling to the ground, loose cotton that once was lost falling in-between spindle harvester's row units can now be harvested.

Self cleaning extractor units are attached to each of the air harvester's row units side panels in a 45 degree angle configuration, with self cleaning extractor units being spaced approximately 5 inches apart with left and right self cleaning extractor units facing each other, wherein the self cleaning extractor units begin harvesting cotton at the base of the cotton plants, lower self cleaning extractor units are the first to come in contact with the cotton plants, self cleaning extractor units are strategically placed to fully cover the entire cotton plant, and harvest cotton from both sides of the cotton row, the 45 degree angle configuration of the self cleaning extractor units spreads harvester's row units contact over a larger number of the cotton plants helping each plant to support each other as harvester's row units push through the cotton plants.

Air flow is the result of blower fans which force air from inside air plenum transfer chamber out thru harvester's duct work to harvester's basket on harvester's chassis, as air is forced out it creates a vacuum inside air plenum transfer chamber which causes the outside atmospheric pressure to force outside air in thru harvester's self cleaning extractor unit's openings to replace the air that has been removed from air plenum transfer chamber, thus creating a continuous air flow. Blower fans also supply air flow for blower nozzles.

Cotton plants are compressed together to approximately 9 inches as harvester's row units enters cotton row and are furthered compressed together to approximately 5 inches by self cleaning extractor units. Cotton plant's limbs are folded together in order to bring seed cotton into close contact with self cleaning extractor units openings where seed cotton is harvested from both sides of the cotton plants.

Air flow enters harvester's row units from the front and rear creating a wind tunnel effect and intensifies as it is forced thru self cleaning extractor unit's openings, as air flow moves thru cotton plants seed cotton is dislodged from cotton burr and is then blown (vacuumed) into self cleaning extractor unit's openings.

The large amount of plant material moving thru self cleaning extractor units creates a self cleaning environment using cotton plants as a cleaning method to push unwanted material thru harvester's row units.

It is another object of this invention to provide a cotton air harvester that can harvest narrow row cotton as well as wide row cotton by repositioning harvester's row units position.

It is another object of this invention to provide a more environmentally friendly cotton air harvester by eliminating the need for large amounts of lubricant and water that spindle harvesters require.

It is still another object of this invention to provide a less complicated cotton air harvester by completely eliminating the need for spindles, doffers, moistener pads, bars, chains, cutter blades, brushes, augers, and the many gears and miscellaneous parts now required on today's harvesters.

It is another object of this invention to provide a better quality of harvested seed cotton by eliminating wetting of seed cotton, seed damage, spindle twist, spindle warping, spindle breakage, bark grinding, and the high trash content of spindle and stripper harvesters.

It is another object of this invention to provide a much safer cotton air harvester by eliminating thousands of dangerous moving parts and cutter blades.

It is another object of this invention to reduce the large amount of seed cotton that falls to the ground which spindle harvesters are unable to harvest.

It is another object of this invention to provide a self cleaning cotton air harvester, by using the large amount of plant material constantly moving past harvester's self cleaning extractor units, thus creating a self cleaning environment using cotton plants as a cleaning method to push unwanted material thru air harvester's row units.

It is another object of this invention to reduce the high manufacturing cost associated with new cotton harvesters by eliminating the need for spindles, doffers, moistener pads, bars, chains, cutter blades, brushes, augers, and the many gears and miscellaneous parts now required on today's cotton harvesters. It is another object of this invention to reduce high maintenance and repair costs.

It is another object of this invention to provide a cotton air harvester row unit that does not require spindles, doffers, brushes, rotating drums or cutter blades, and the elimination of thousands of parts, resulting therefore in a much lighter harvester header assembly. This reduced weight allows, harvester's row units to be grouped closer together than spindle or stripper harvesters, resulting in a more versatile harvester unit which can harvest wide row or narrow cotton, and can be used in combination with spindle harvesters, and be mounted in front of existing spindle harvester's row units, or be mounted on a tractor, or used as a single walk behind air harvester unit.

These and other objects, features and advantages of the present invention will become apparent to one skilled in the art upon reading the following detailed description in view of the drawings.

DETAILED DESCRIPTION OF THE DRAWINGS

The present invention provides a cotton air harvester row unit that is capable of harvesting seed cotton from either wide row or narrow row planted cotton. The embodiments herein and the various features and advantageous details thereof are explained more fully with reference to the non-limiting embodiments that are illustrated in the accompanying drawings and detailed in the following description. The examples used herein are intended to facilitate an understanding of ways in which the invention herein may be practiced and to further enable those of skill in the art to practice the embodiments herein. Accordingly, the examples should not be construed as limiting the scope of the claimed invention.

Figure 1:
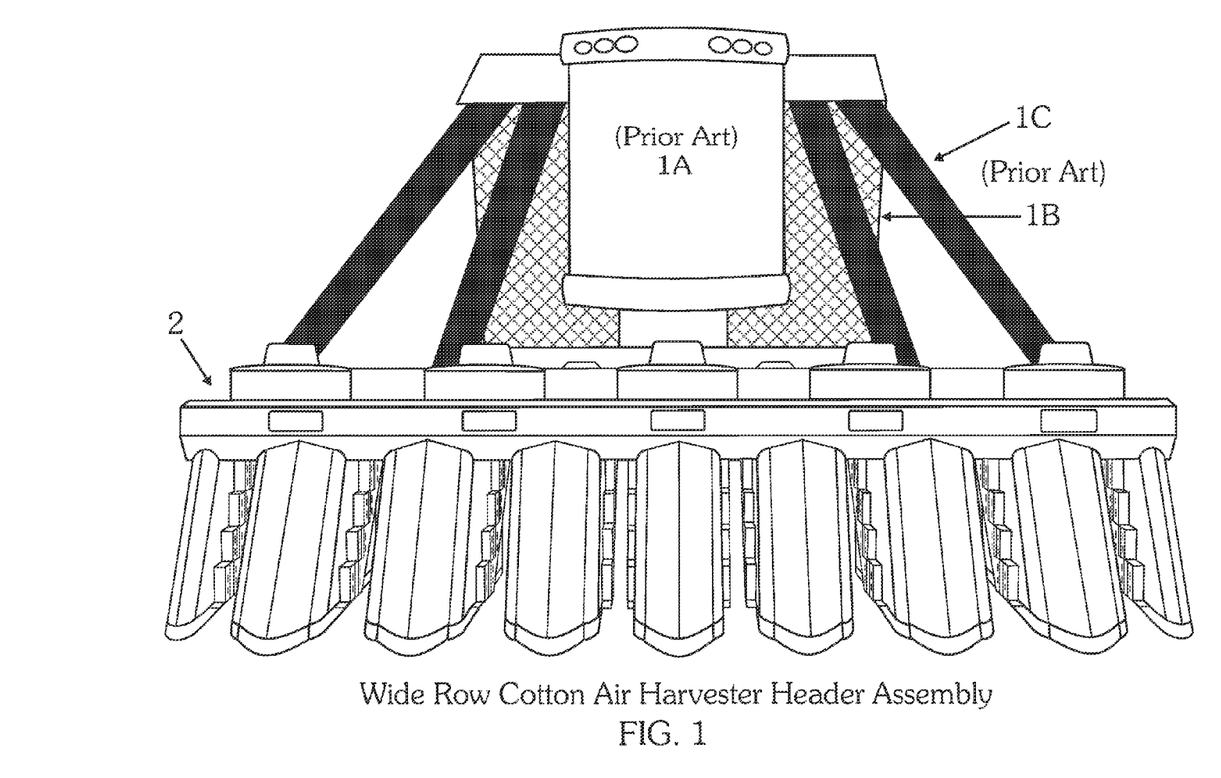
FIG. 1 shows a front view of a wide row cotton air harvester header assembly, attached to the front of a conventional self propelled cotton harvester's chassis (prior art).

Referring now to the drawings, FIG. 1 shows a front view of a wide row cotton air harvester header assembly 2, attached to the front of a conventional self-propelled cotton harvester's chassis 1A (prior art), for movement through a field of cotton plants in equally spaced rows. Air harvesters use air flow (wind, vacuum, atmospheric pressure) to harvest seed cotton from cotton plants.

Figure 2:
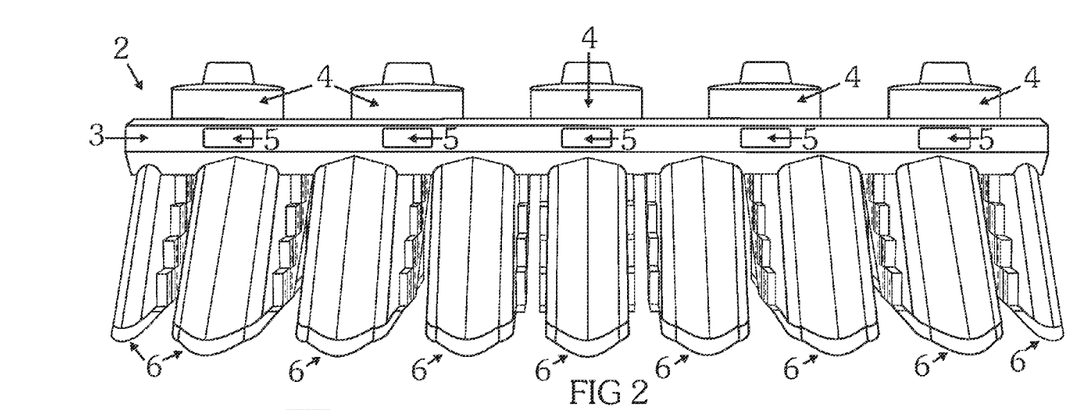
FIG. 2 shows a front view of a wide row cotton air harvester header assembly.

FIG. 2 shows a front view of a wide row cotton air harvester header assembly 2; consisting of a main metal framework (not shown), for attachment to the front lifting mechanism of a conventional self propelled cotton harvester's chassis (not shown), an air plenum transfer chamber 3 having a top, sides, ends, and bottom as to form an airtight air plenum chamber which is mounted on top of header's framework, and is divided into sections to allow for uneven field conditions, blower fan units 4, are mounted on top of air plenum transfer chamber, or can be mounted on harvester's chassis. Air harvester's row units 6, are attached to the underside (bottom) metal framework of air plenum transfer chamber 3. Air harvester header assemblies can be manufactured using materials which are now used in modern cotton harvesters.

Figures 3, 3A:
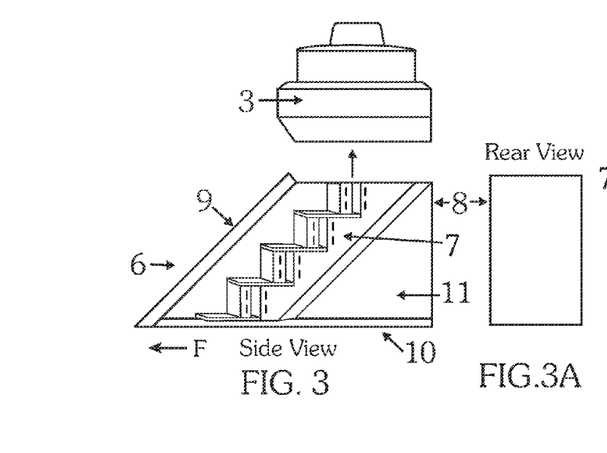
FIG. 3 is a side view of cotton air harvester's row unit.
FIG. 3A is a rear view of cotton air harvester's row unit's rear panel cover.

FIG. 3 is a side view of cotton air harvester's row unit 6, self cleaning extractor units 7 attached to harvester's row unit's side panel 11, front cover panel 9 attached to front of harvester's row unit 6, rear cover panel 8, and bottom panel 10 (not shown), harvester's row units are attached to the underside (bottom) metal framework of air plenum transfer chamber 3.

FIG. 3A is a rear view of cotton air harvester's row unit's 6 rear panel cover 8.

Figure 4:
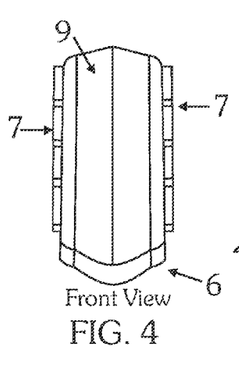
FIG. 4 is a front view of cotton air harvester's row unit.

FIG. 4 is a front view of cotton air harvester's row unit 6, with left and right self cleaning extractor units 7 and front cover panel 9.

Figure 5:
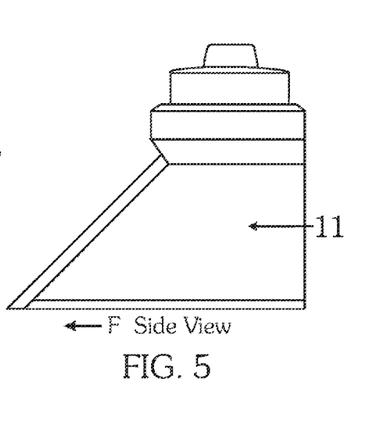
FIG. 5 shows right side end view of cotton air harvester header assembly.

FIG. 5 shows harvester's row unit's side panel 11 without self cleaning extractor panel 7.

Figure 6:
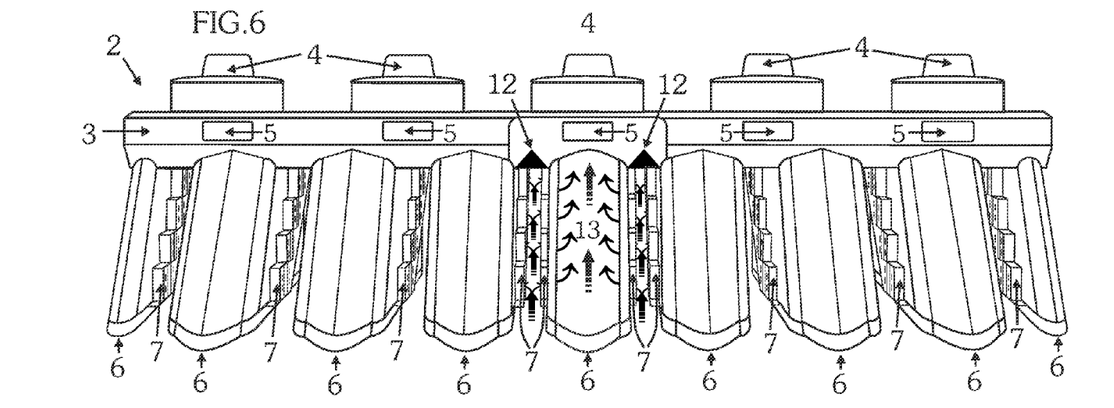
FIG. 6 shows front cut away view of cotton air harvester header assembly.

FIG. 6 shows front cut away view of cotton air harvester header assembly 2. Air turbulence and debris shields 12 are used to cover flat surfaces to help reduce air turbulence, and debris from collecting inside air plenum transfer chamber 3. Service panels 5 are for inspection and maintenance inside air plenum chamber 3. Blower fans 4 force air 13 (denoted by large black arrows) from inside air plenum chamber 3, thru duct work into harvester's basket 1C FIG. 1 (prior art), thus creating a vacuum inside air plenum chamber 3. As the air exits air plenum transfer chamber 3, atmospheric pressure 13 forces outside air to rush in thru harvester's extractor units 7 thus creating a continuous air flow.

Figure 7:
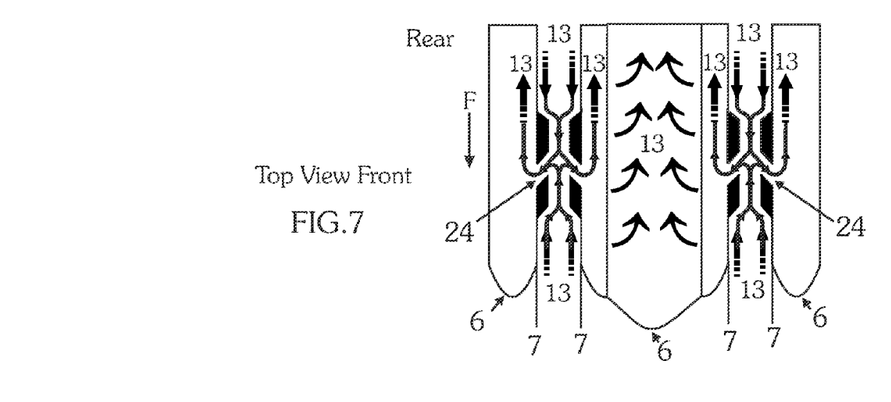
FIG. 7 is an enlarged view of FIG. 6 detailing air flow.

FIG. 7 is an enlarged view of FIG. 6 detailing air flow 13 (denoted by large black arrows). Atmospheric pressure 13 forces outside air to enter in-between harvester's left and right row units 6 from the front and rear and then into self cleaning extractor's openings 24 in thru air plenum transfer chamber 3 FIG. 6.

Figures 8, 9, 10:
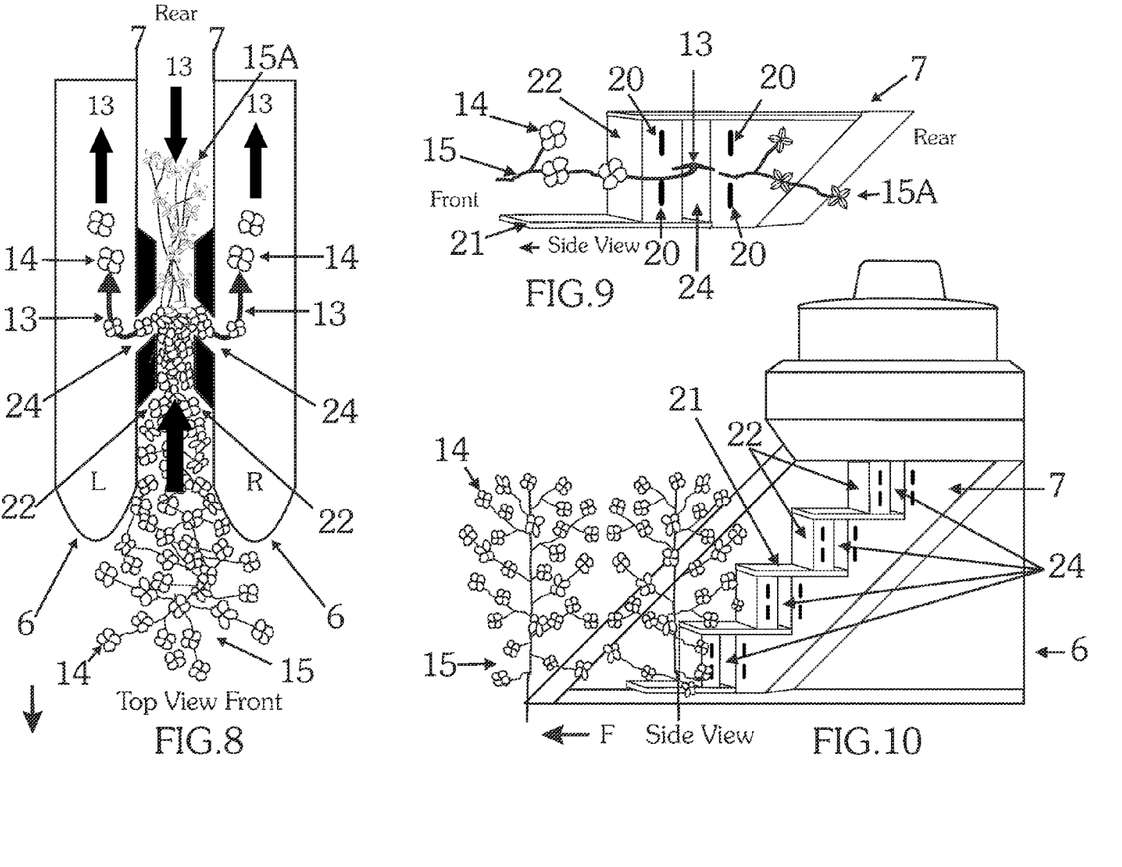
FIG. 8 is a top view of cotton air harvester's row units entering cotton row.
FIG. 9 is a side view enlargement of a self cleaning extractor unit showing seed cotton being extracted from cotton plant.
FIG. 10 is a side view of cotton air harvester's row unit entering cotton row.

FIG. 8 is a top view of cotton air harvester's row units 6 entering cotton row. Cotton plants 15 are compressed together to approximately 9 inches as row units enters cotton row and are furthered compressed together to approximately 5 inches by extractor unit's front panel 22, (also see 23 and 25 of FIG. 16). Cotton plant's limbs 15 are folded together in order to bring seed cotton 14 into close contact with self cleaning extractor units openings 24, where seed cotton 14 is removed from cotton plants 15A (also see FIG. 9). Cotton is harvested from both sides of the cotton plants using air flow 13 (wind, vacuum, atmospheric pressure). The large amount of plant material moving thru extractor units create a self cleaning environment using cotton plants 15A, as a cleaning method to continually push unwanted material past harvester's self cleaning extractor units.

FIG. 9 is a side view enlargement of self cleaning extractor unit 7, showing seed cotton 14 being extracted from cotton plant 15, as self cleaning extractor units move thru cotton plants 15 air flow 13 dislodges (vacuums) seed cotton 14 from cotton burrs 15A which is then blown into basket. Blower nozzles 20 increase air flow to help dislodge hard locked seed cotton, blower nozzles may oscillate or be stationary and can be arranged in different configurations. Ledge panel 21 helps guide cotton to extractor's front panel 22 which moves cotton out away from row unit's side panels past extractor unit's opening.

FIG. 10 is a side view of cotton air harvester's row unit 6 entering cotton row. Self cleaning extractor units 7 begin harvesting cotton at the base of the cotton plants 15, the lower extractor units are the first to come into contact with the cotton plants 15. Extractor's openings 24 are strategically placed to fully cover entire cotton plant 15; the 45° angle (step up configuration) of harvester's self cleaning extractor units 7, spreads extractor units contact over a larger number of cotton plants helping to support each other as harvester's row units push thru cotton plants 15. Harvester unit's smooth streamline design allows harvester units to slide through cotton plants with the least resistance as possible. 21 shows ledge of extractor unit extending outward from panel side (see 21 FIG. 9), ledge 21 helps guide cotton to extractor unit's opening and also allows loose falling cotton 16 to be harvested before reaching the ground (see 16 FIGS. 11 and 16 FIG. 12). Front panel 22 moves cotton out away from row unit's side panels to compress cotton limbs as they enters extractor's self cleaning panels.

Figure 11:
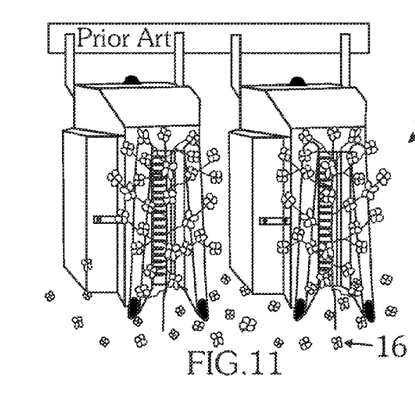
FIG. 11 is a simplified front view of spindle type cotton harvester's row units moving thru cotton plants (prior art).

FIG. 11 is a simplified front view of spindle type cotton harvester's row units (prior art); showing loose cotton 16 falling to the ground. Spindle cotton harvesters are unable to harvest any cotton until cotton plants 15 reach spindle units which results in the loss of large amounts of loose cotton 16 that falls to the ground.

Figure 12:
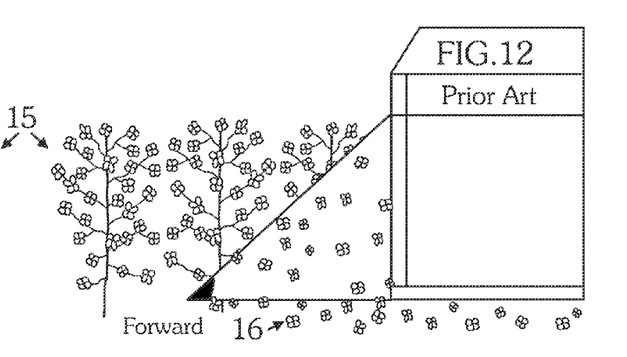
FIG. 12 is side view of spindle type cotton harvester's row unit FIG. 11 (prior art).

FIG. 12 is side view of spindle type cotton harvester's row units showing seed cotton 16 falling to the ground unable to reach the spindle units (prior art).

Figure 13:
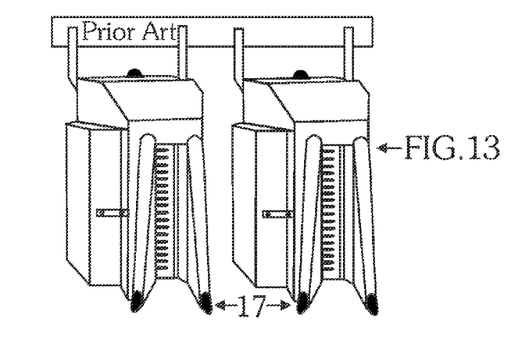
FIG. 13 shows front view of spindle type cotton harvester's row units (prior art).

FIG. 13 shows front view of spindle type cotton harvester's row units (prior art). Spindle type cotton harvesters require large amount of parts which limit how close together harvester row units can be spaced 17, also enough room is required for service and maintenance.

Figure 14:
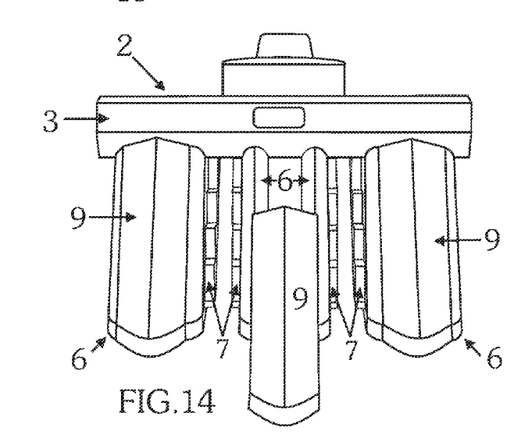
FIG. 14 is a front view of cotton air harvester's row units showing front cover panels

FIG. 14 is a front view of cotton air harvester's row units 6 showing front cover panels 9, which are used to salvage loose cotton 16 before it can fall to the ground (see FIG. 11 and FIG. 12). Front cover panels 9 are designed to cover the open space between cotton rows, (see 17 FIG. 13 prior art) which allows loose falling cotton 16 to slide over onto air harvester's extractor units 7. Loose cotton 16 that once was lost falling in-between cotton rows can now be salvaged (see FIG. 12).

Figures 15, 16, 17:
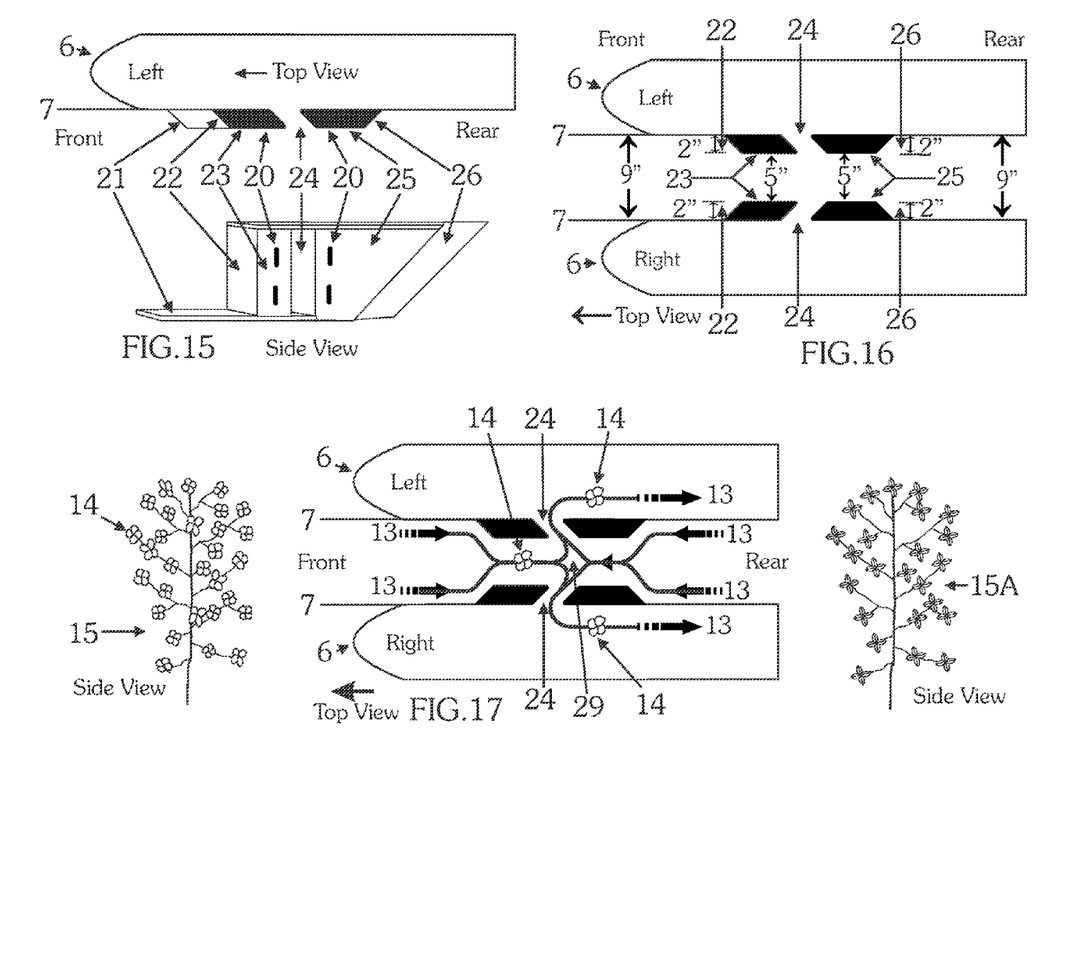
FIG. 15 shows top and side views of harvester's self cleaning extractor unit.
FIG. 16 is a simplified schematic top view of cotton air harvester's row units.
FIG. 17 is a top view of cotton air harvester's row unit showing how air flow is used to harvest seed cotton from cotton plants.

FIG. 15 shows top and side views of a self cleaning extractor unit 7; consisting of bottom ledge 21, which also serves as top ledge 21 and extends out from side panel approximately 2 inches. Extractor's front panel 22 extends outward approximately 2 inches and rearward at 45°, front flat panel 23, rear flat panel 25, rear edge panel 26 sloping rearward to harvester's side panel at 45°, and blower nozzles 20. Extractor's opening 24 angles forward 45° in the direction of harvester's forward movement, which helps restrict plant material from becoming snared when passing extractor's opening 24. Self cleaning extractor units are stacked together in a 45° stair configuration, (see 7 FIG. 10).

FIG. 16 is a simplified schematic top view of cotton air row units 6, showing row units 6 facing each other and are spaced approximately 9 inches apart; left and right self cleaning extractor units 7 also face each other and extend out from panel sides approximately 2 inches (see 22 and 26). Extractor's flat panels 23 and 25 are spaced approximately 5 inches apart, and extractor's opening 24 which angles rearward 45° from harvester's row unit's side panel.

FIG. 17 is a top view of cotton air harvester's row units 6, showing how air flow 13, (wind, vacuum, atmospheric pressure, denoted by large black arrows) is used to harvest seed cotton 14 from cotton plants 15, air flow 13 is the result of blower fan units 4, which force air from inside air plenum transfer chamber 3 FIG. 6, thru duct work 1C to basket 1B on harvester's chassis 1A (see FIG. 1 prior art and FIG. 6), as air is forced out it creates a vacuum inside air plenum transfer chamber 3 which causes the outside atmospheric pressure 13, to force outside air in thru extractor unit's openings 24, to replace the air that has been removed from air plenum transfer chamber 3, thus creating a continuous air flow 13. As harvester's row units 6 enter cotton plants 15, air flow 13 enters harvester row units 6 from the front and rear and intensifies as it is forced thru extractor unit's openings 24. As air flow 13 moves thru cotton plants 15 seed cotton 14 is dislodged from cotton burr 15A and is then blown (vacuumed) into extractor unit's openings 24. Air flow 13 is the most intense where front and rear air flows 13 meet together 29 at extractor unit's openings 24.

Figure 18:
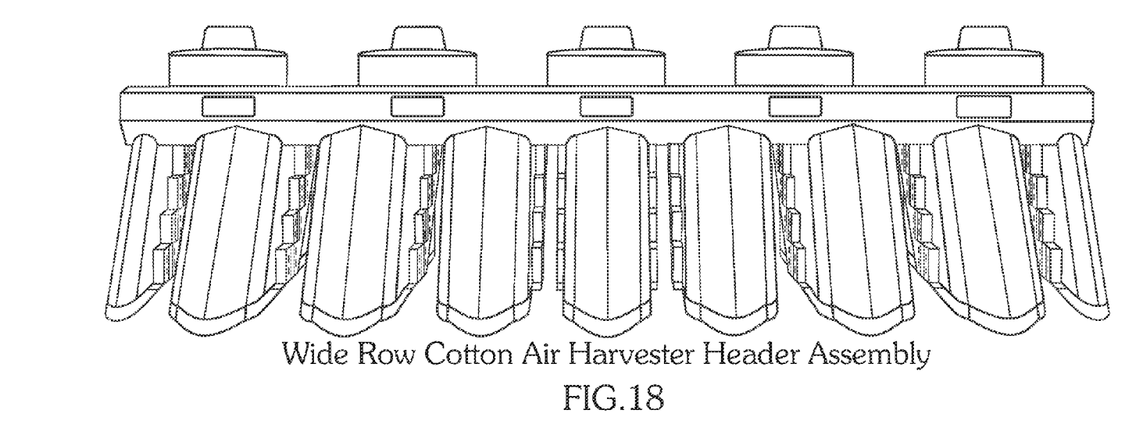
FIG. 18 is a front view of wide row cotton air harvester header assembly.

FIG. 18 is a front view of wide row cotton air harvester header assembly.

Figure 19:
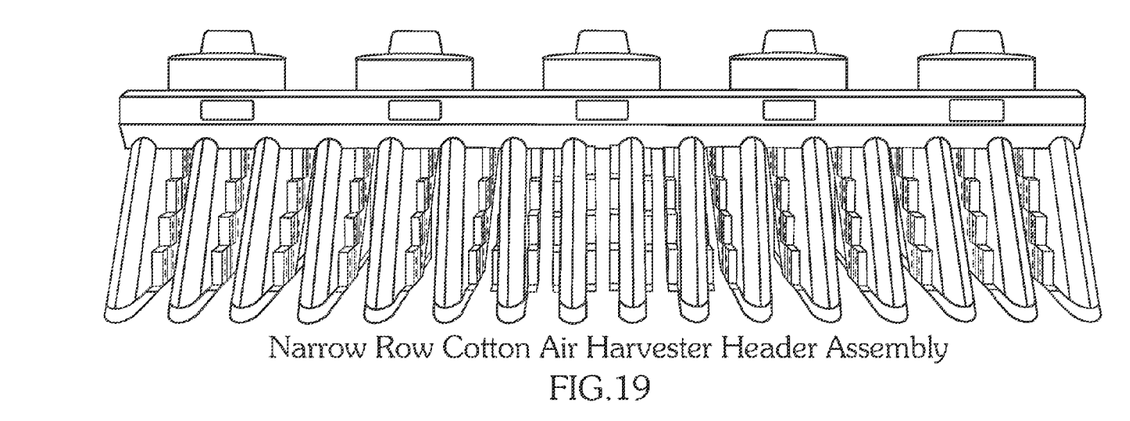
FIG. 19 is a front view of narrow row cotton air harvester header assembly.

FIG. 19 is a front view of narrow row cotton air harvester header assembly.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the accompanying claims are intended to protect the invention broadly as well as in the specific form shown.

The invention claimed is:

1. A self-propelled cotton air harvester comprising:
    a header assembly attached to a front lifting mechanism of the harvester for movement through a field of cotton plants in equally spaced rows, the header assembly consisting of:
    a) a main metal framework;
    b) an air plenum transfer chamber having a top, sides, ends, and bottom, the air plenum transfer chamber is mounted on top of the main metal framework of the header assembly making up the upper section of the header assembly;
    c) a plurality of row units each comprising left and right side panels, wherein front edges of the left and right side panels of the row units slope backward at a 45 degree angle, the row units are attached to the bottom of the main metal framework of the header assembly making up the lower section of the header assembly, the row units are spaced approximately 9 inches apart with the left and right side panels of neighboring row units facing each other thereby creating a streamlined tunnel to allow for the least resistance as the cotton plants move through the tunnels of neighboring row units;
    d) a plurality of self-cleaning extractor units attached in a 45 degree angle along the front edges of the left and right side panels of each of the row units for fully harvesting the entire cotton plant, the self-cleaning extractor units are spaced approximately 5 inches apart with the self-cleaning extractor units of neighboring row units facing each other, wherein lower, forwardmost self-cleaning extractor units are the first to contact the cotton plants at the base of the cotton plants, openings of the self-cleaning extractor units angle inward and forward at 45 degrees into the side panels which helps restrict the plants from becoming snared when moving past the openings;
    e) blower fans which force air from inside the air plenum transfer chamber out through ductwork to a harvester basket thereby creating a vacuum inside the air plenum transfer chamber which causes the outside atmospheric pressure to force outside air in through the openings of the self-cleaning extractor units to replace the air that has been removed from the air plenum transfer chamber by the blower fans creating a continuous air flow that harvests seed cotton from the cotton plants;
    wherein the cotton plants are compressed together to approximately 9 inches as they enter the row unit tunnels and are further compressed together to approximately 5 inches by the self-cleaning extractor units whereby limbs of the cotton plants are folded together to bring the seed cotton into close contact with the openings of the self-cleaning extractor units, as air flow moves through the cotton plants, seed cotton is dislodged from the plant and is sucked into the openings of the self-cleaning extractor units, the large amount of seed cotton moving through the self-cleaning extractor units creates a self-cleaning environment using the cotton plants to push and clean unwanted plant material through the row units.

2. The self-propelled cotton air harvester of claim 1, wherein the air plenum transfer chamber is divided into sections to allow for uneven field conditions, air turbulence and debris shields cover flat surfaces to restrict air turbulence and debris from collecting inside the air plenum transfer chamber to which the blower fans are attached, side inspection panels are used for inspection and maintenance, and the air plenum transfer chamber also serves to evenly regulate air flow.

3. The self-propelled cotton air harvester of claim 1, the row units further comprise a front cover panel to cover the open space between the rows of cotton plants which allow loose falling cotton to slide over and into the openings of the self-cleaning extractor units to salvage cotton that would otherwise be lost, a rear cover panel, a bottom panel.

4. The self-propelled cotton air harvester of claim 1, each self-cleaning extractor unit consisting of: a bottom ledge which also serves as top ledge and extends out from the side panels approximately 2 inches, extractor front panels extending outward approximately 2 inches and rearward at 45 degrees, front flat panel, rear flat panel, rear edge panel sloping rearward to the side panel at 45 degrees, and blower nozzles which increase air flow to help dislodge hard locked seed cotton.

5. The self-propelled cotton air harvester of claim 4, wherein the blower nozzles are located at front and rear openings of the extractor units which direct additional streams of air against seed cotton to help dislodge hard locked seed cotton, the blower nozzles oscillate or are stationary.

6. The self-propelled cotton air harvester of claim 1, wherein cotton is harvested from both sides of the cotton plants, air flow enters the row units from the front and rear and intensifies as it is forced through the openings of the self-cleaning extractor units, as air flow moves through the cotton plant, cotton seed is dislodged from plant and is then vacuumed into the openings, the openings allow a large amount of cotton to move into the row unit, the flat surface of the extractor units allow cotton limbs to slide across the openings without being pulled into the openings, the large amount of cotton plants moving through the row units creates a self-cleaning environment using the cotton plants to continually push and clean unwanted material through the row units, thereby preventing material from collecting inside row units.

7. The self-propelled cotton air harvester of claim 1, wherein the row units are attached to the underside of the air plenum transfer chamber thus creating a tunnel effect, the row units act as wind tunnels that fully cover the entire row of cotton from the top of the cotton plants to the bottom with a strong concentrated air flow, air flow enters row units from the front and rear and intensifies as it enters the openings of the self-cleaning extractor units from all directions, thereby maximizing air flow turbulence to completely surround and dislodge seed cotton from the cotton plant by utilizing the tremendous power and flexibility of air flow to harvest seed cotton by bringing the seed cotton and air flow together at the openings of the self-cleaning extractor units.

8. The self-propelled cotton air harvester of claim 1, wherein the row unit left and right panels face each other and are attached to the underside of the air plenum transfer chamber, row units are spaced approximately 9 inches apart creating a tunnel that moves over the cotton plants, the row units can harvest wide row or narrow row cotton by repositioning the row units and front cover panels according to the desired row width, the row width is the distance between cotton rows, narrow row cotton is planted closer together and wide row cotton is planted further apart.

9. The self-propelled cotton air harvester of claim 1, wherein the row units do not require spindles, doffers, brushes, rotating drums or cutter blades resulting in a much lighter and smaller header assembly allowing the row units to be grouped closer together than spindle or stripper row units, the harvester can be used in combination with spindle harvesters, and can be mounted in front of existing spindle harvester's row units, or be mounted on a tractor, or used as a single walk behind air harvester unit.

* * * * *